UNITED STATES PATENT OFFICE.

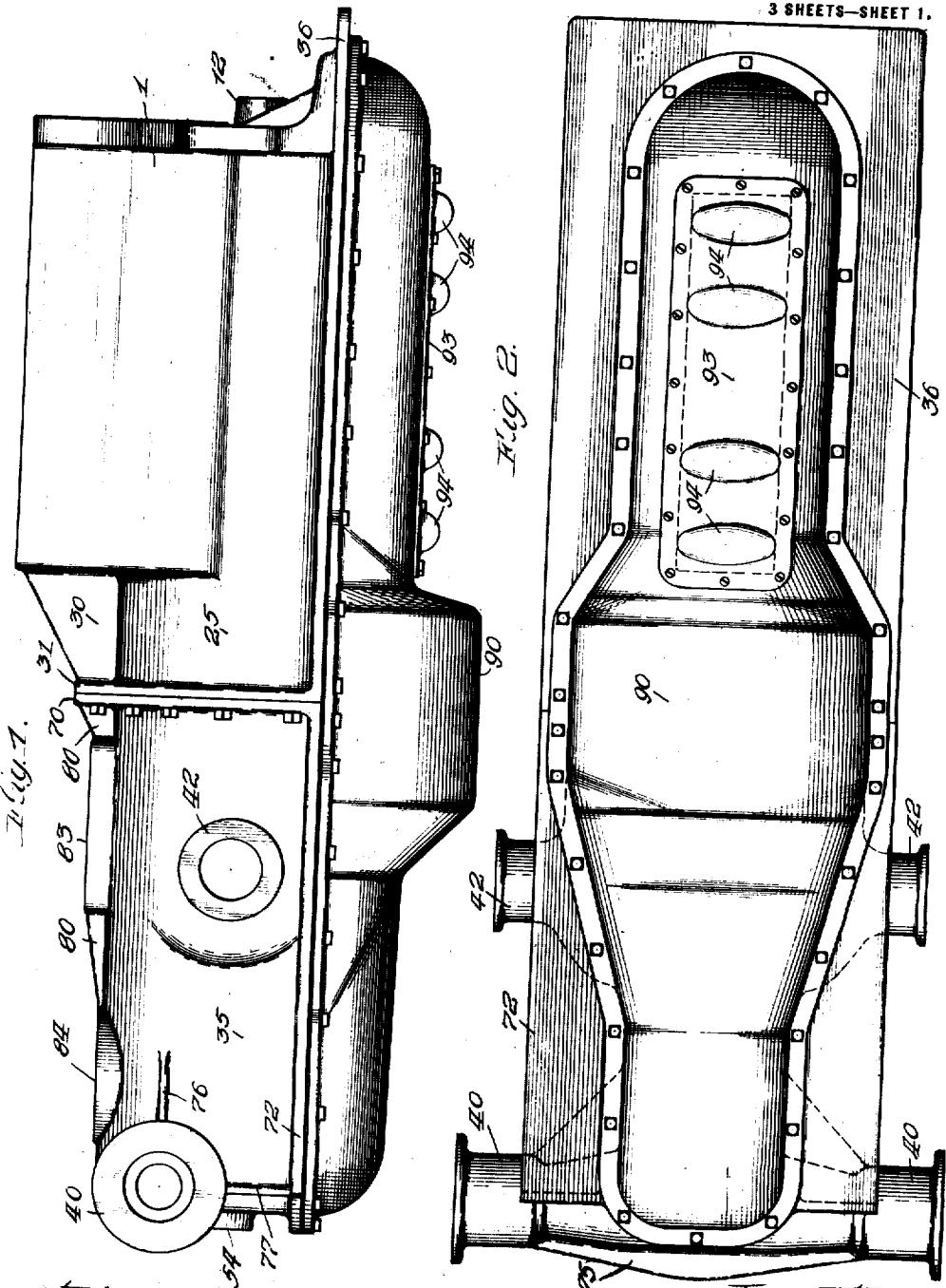

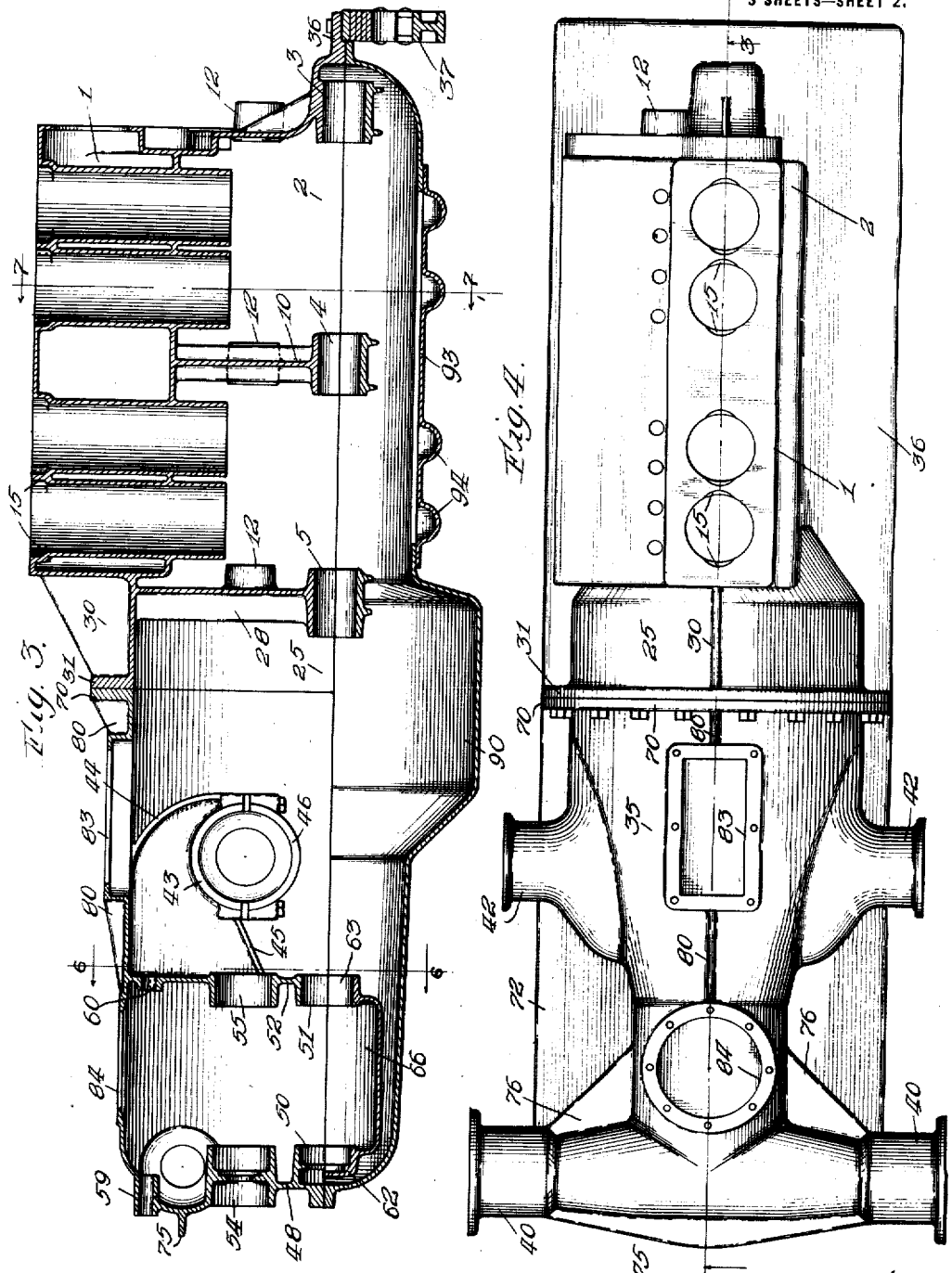

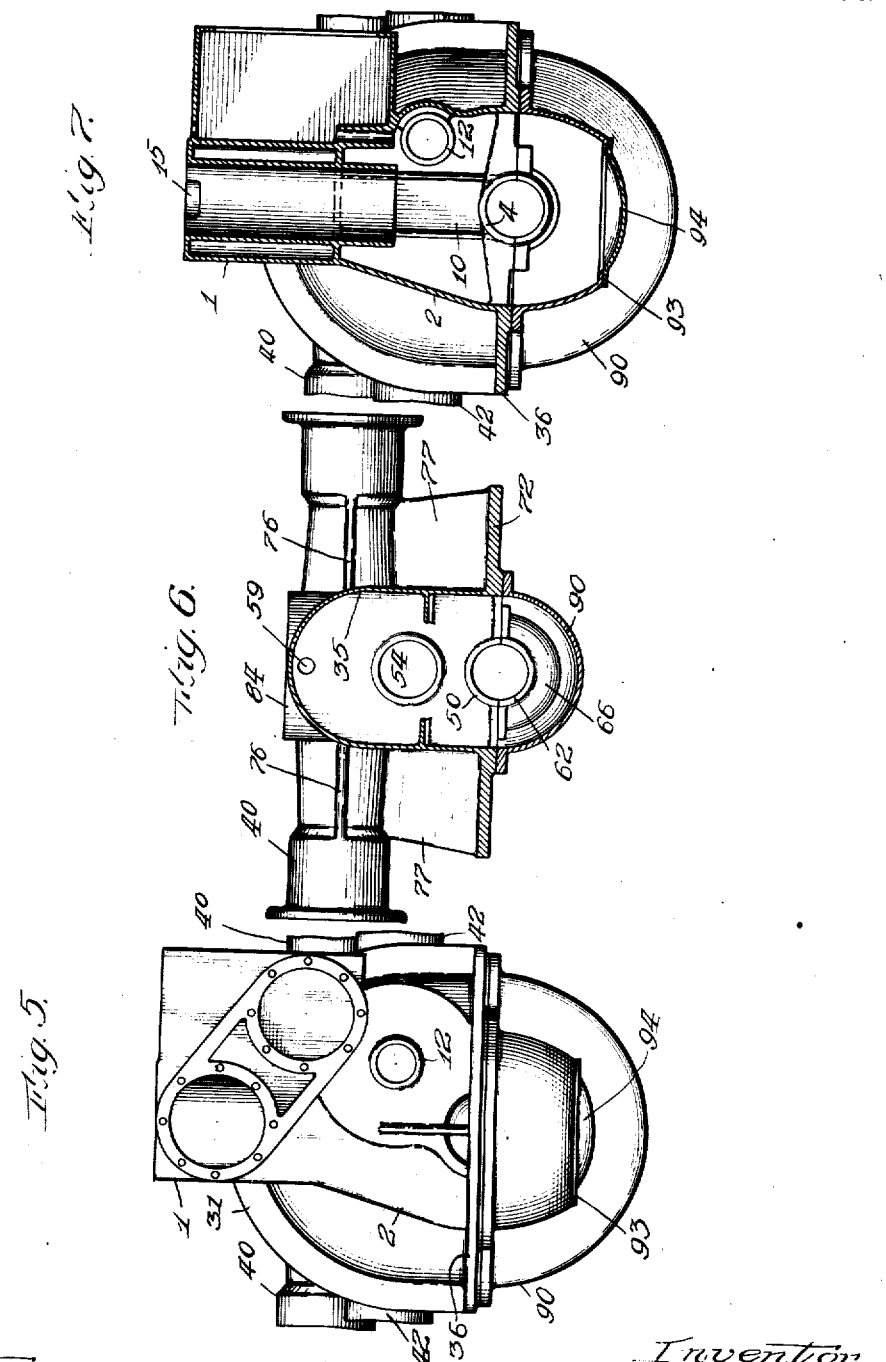

HUGO F. SCHMIDT, OF CHICAGO, ILLINOIS.

TRACTOR.

1,241,563.  Specification of Letters Patent.  Patented Oct. 2, 1917.

Application filed June 3, 1916. Serial No. 101,515.

*To all whom it may concern:*

Be it known that I, HUGO F. SCHMIDT, a citizen of the United States, residing in Chicago, in the county of Cook and State of Illinois, have invented certain new and useful Improvements in Tractors, of which the following is a specification.

This invention relates to improvements in tractors and similar machines, and more especially to improvements in the design and construction of the frames of tractors propelled by internal combustion engines to better adapt them for the work which they are intended to perform.

Heretofore gasolene and oil-driven tractors and similar machines have been constructed with frames of various forms which have been copied more or less from other types of self-propelled vehicles, such as the ordinary pleasure motor car, as automobile, and the commercial motor car, or truck; although the conditions of service in the case of the tractor are greatly different.

A tractor is intended for use to a large extent over rough and mean ground, and is designed to exert a great draw-bar pull, although it is not ordinarily required to carry much if any dead load. It is necessary therefore to have a frame which can withstand the effect of such service without distortion and without being so heavy as to impair the efficiency of the machine, such frame ordinarily also being unaided by supporting springs between it and the driving wheels.

One of the objects therefore of the present invention is to produce a frame which shall possess the necessary strength and rigidity to transmit the power to the driving wheels and to draw the required loads, without being affected by the travel of the machine over rough and mean ground, through ditches and over obstacles, without danger of weakening through vibration from the engine and shocks and jolts from the ground, and without distortion, which would tend to throw the moving parts out of line and thus impair the efficiency of the machine.

A tractor frame embodying the principles of the present invention is shown in the accompanying drawings, in which:

Figure 1 is a view of the complete frame in side elevation.

Fig. 2 is a bottom plan view.

Fig. 3 is a longitudinal vertical section through the entire frame, taken on the line 3—3 of Fig. 4.

Fig. 4 is a top plan view of the complete frame.

Fig. 5 is a view showing the frame in front elevation.

Fig. 6 is a transverse vertical section on the line 6—6 of Fig. 3.

Fig. 7 is a similar section on the line 7—7 of Fig. 3.

As shown in said drawings the entire frame for the complete tractor, including the engine and the transmission gearing for transmitting the power to the driving wheels comprises one unitary structure, which, as here shown, is preferably made in three parts secured together by bolts and studs. The forward part 1 includes in one integral casting the engine cylinders—here shown as four in number, although the number of cylinders might be varied without departing from the spirit of this invention—which cylinders are arranged side by side in what is known as "block" form and are also cast integral with the upper half of the crank-case 2. This casting includes also the upper halves of the crankshaft journal boxes, 3, 4 and 5, respectively, of which the center journal 4, is supported by a web, 10, in the crank-case, journals for the cam-shaft 12, 12, and water-jacket spaces 15, 15 as will be understood by those who are familiar with the art; and its rear part is formed to provide the upper half 25 of a fly-wheel housing. This latter part of the casting being required to carry a considerable load, as will be seen hereinafter, there is also included in the casting and within the fly-wheel housing a radial web 28 which joins the front wall of the housing and extends from the rear crank-shaft bearing 5 to the upper wall of the housing; and over the top of the housing 25 there is formed a longitudinal, vertical web 30. The fly-wheel housing 25 terminates in a circumferential flange 31 by means of which it may be bolted to the rear part 35, of the unitary frame structure; and joining the lower ends of this flange and extending horizontally from the edges of the open under side of the crank-case 2 is a wide rectangular flange or shelf, 36, which occupies the position of the side and front frame members of an ordinary motor-car frame; the front edge of this flange being designed to rest on the front axle, as indicated at 37.

The rear part 35 of the unitary frame structure is preferably formed by casting also, and is shaped to accommodate the necessary shafts and gearing comprising the mechanism for transmitting the power from the crank-shaft to the driving wheels, as well as to provide a pair of journal boxes for carrying its own weight and the weight of the forward part 1 upon the rear axle (not here shown). For this purpose, the part 35 is formed at its rear part with laterally extending tubular parts 40, 40 through which are journaled the rear axle of the machine, and forward of these and parallel with them are two similar, but shorter tubular parts 42, 42 in which may be journaled a jack-shaft (not shown) for rotating the driving wheels through chains or gearing as may be desired. As such jack-shaft would ordinarily be divided through a differential gear and driven from its center part, there are also provided two journal boxes between the tubular parts 42; one of such journal boxes being shown in Fig. 3 and comprising an upper half 43, which is supported in the large casting 35 by webs 44 and 45, and a lower half 46 which is bolted to the upper half by bolts as shown. The other center journal box, not shown, is substantially similar in all respects to that which is shown.

At the bottom of the rear wall 48 of the part 35, and in line with the rear crank-shaft journal 5, above described, there is formed the upper half 50 of a journal box for the main shaft in a sliding-gear-set, of well known form, and forward of it and in proper alinement with it and the journal 5 is the upper half 51 of the other journal box for such shaft; the part 51 being supported by an integral transverse vertical wall 52 (Fig. 3) which is an integral part of the main casting. Above the journal parts 50 and 51, and similarly arranged respectively in the rear wall 48 and the transverse wall 52 are another pair of journal boxes, 54 and 55, to support the counter-shaft of the gear-set; and above the latter in turn are small journals or openings 59, 60 through the same two walls for a shifting rod to shift the gears for the necessary gear-changes, as will be understood. The journal boxes 50 and 51 are completed by two inverted bearing caps 62 and 63 which are secured to the upper parts by bolts and are connected to each other by an oil-pan or grease-pan 66 so as to permit of independent lubrication of the moving parts in the gear-set.

The forward edge of the part 35, which is semicylindric as viewed in transverse vertical section, is surrounded by a circumferential flange 70 to bolt to the flange 31, as shown; and joining the lower ends of this flange and in continuation of the flange 36, above described, is a corresponding horizontal flange 72 so that these two flanges above constitute in effect a complete rectangular frame for the machine, or tractor, but depend upon other parts of the two castings, as above described, to reinforce and strengthen them throughout. In addition, there is provided a transverse horizontal flange or web, 75, extending rearwardly from the wall 48, between the two tubular parts 40; a pair of triangular horizontal flanges, 76, and a similar pair of vertical flanges 77, 77, joining these tubular parts and the main body of the casting to reinforce the rear axle journals against horizontal and vertical stresses.

Along the top of the casting 35 is formed a longitudinal, vertical web or flange 80, which is in effect a prolongation of the flange 30 on the engine part 1 of the frame structure, these two flanges thus forming a "back-bone" for the machine; but the flange 80 through a part of its length is made double, to surround a rectangular opening 83 which provides access to the jack-shaft, and it terminates immediately forward of a second opening 84, providing access to the gear-set below.

The third, or bottom part of the frame structure is made simply in the form of a large pan 90 extending substantially the full length of the entire frame structure and bolted to the under sides of both parts 1 and 35; thus joining all three parts together into one strong and rigid unitary frame structure for the entire machine, including the engine, transmission gearing with a jack-shaft, and a rear axle supported on driving wheels. In the center part of the member 90 is made a large semi-cylindric depression to form the lower half of the fly-wheel housing, and in its forward part and below the engine cylinders there is made a large rectangular opening covered by a flat plate, 93, in which are made depressions, 94, 94, to provide oil wells for the engine cranks to dip into, as will be understood; and the plate 93 is made removable as shown to provide access to the crank chamber without disturbing the large pan 90.

I claim as my invention:

1. In a tractor, or similar vehicle, a unitary frame structure divided horizontally, the upper half including the substantial part of an engine structure and a transmission gear housing, and the lower half being made in one piece joined to the upper half and extending substantially the entire length of the frame structure.

2. In a tractor, or similar vehicle, a unitary frame structure divided horizontally, the upper half including the substantial part of an engine structure and a transmission gear housing secured rigidly together and adapted to rest on two axles, and the lower half being made in one piece joined to both parts of the upper half and extending substantially the entire length of the frame structure.

3. In a tractor, or similar vehicle, a unitary frame structure divided horizontally, the upper half being adapted to rest on two axles and providing journals for all moving parts, and the lower half being made in one piece joined to the upper half and extending substantially the entire length of the frame structure.

4. In a tractor or similar vehicle, a unitary frame structure providing journals for all moving parts and supported on two axles, such frame structure being divided horizontally throughout its entire length and the lower part being made in one piece from end to end.

In witness whereof, I have hereunto subscribed my name this first day of June 1916.

HUGO F. SCHMIDT.